S. ATHA.
Wheel Hub.

No. 96,656.

Patented Nov. 9, 1869.

Witnesses
Henry G. Acton
Newton Leonard

Inventor
Simon Atha
By Alex. A. C. Klauche & Co.
Attorneys

UNITED STATES PATENT OFFICE.

SIMEON ATHA, OF WEST LIBERTY, OHIO.

IMPROVEMENT IN CARRIAGE-WHEELS.

Specification forming part of Letters Patent No. 96,656, dated November 9, 1869.

*To all whom it may concern:*

Be it known that I, SIMEON ATHA, of West Liberty, in the county of Logan and State of Ohio, have invented a new and useful Improvement in Carriage or Wagon Wheels; and I do hereby declare the following to be a full and correct description of the same, sufficient to enable others skilled in the art to which my invention appertains to fully understand and construct the same, reference being had to the accompanying drawings, which make part of this specification, and in which—

Figure 1:
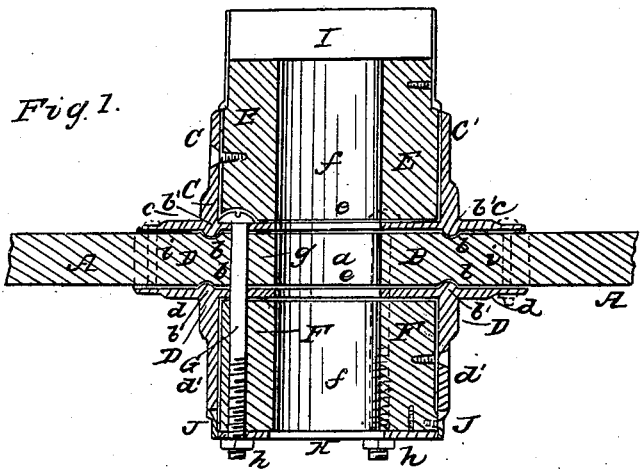
Figure 2:
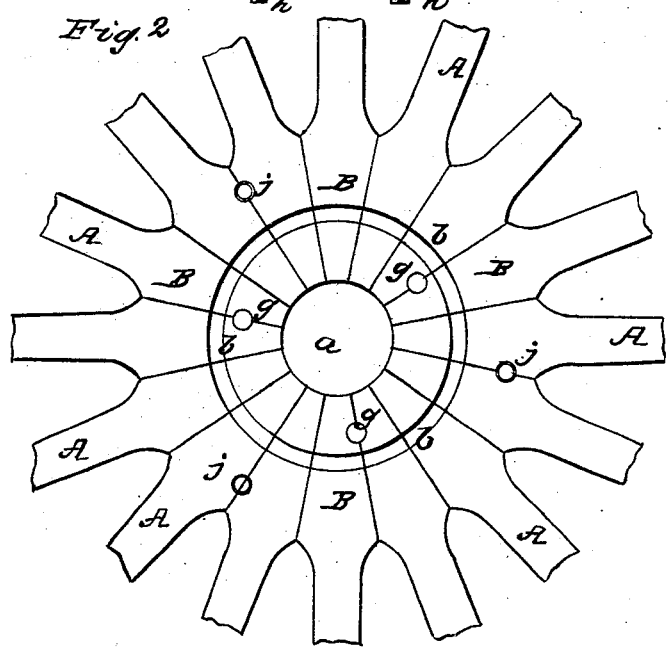

Figure 1 is a sectional view, showing the construction of the hub and wheel; and Fig. 2 is a view showing the formation of the wheel, the hub-boxes being detached.

Like letters of reference indicate like parts in both figures.

The nature of my invention consists in the formation of a carriage or wagon wheel, by first gluing the spokes together at the contiguous ends of their bases, and forcing them together by means of any suitable device, and then fastening the parts constituting the hub to the wheel; further, in the construction and arrangement of the parts constituting the hub, and in the means by which the spokes are prevented from moving out of place.

In the drawings, A represents the spokes, formed with beveled bases B, the contiguous ends of which are first glued and then firmly forced together, by placing a form of any suitable kind around the outer ends of the spokes, and tightening the same by screws or any other suitable means, in such a manner that the spokes are firmly united to each other, and form one wheel before the parts constituting the hub are attached. In the center of the united spokes a circular space, $a$, is formed to allow the axle to pass through. Each of the spokes A is provided, on its two faces of part B, with a curved groove, forming, when together, a continuous circular groove, $b$, by means of which the spokes are securely held, and prevented from moving, as hereinafter more fully described. C D are two circular boxes, cast or otherwise formed of two circular flanges, $c\ c'\ d\ d'$, at right angles to each other, as shown. The flanges $c\ d$ are provided with inwardly-extending circular rims $b'$, which fit into the circular grooves $b$, on the faces of parts B of the spokes, and thus prevent any movement of the latter. They are also provided with central openings $e$, which correspond to the opening or space $a$ in the center of the united spokes, and the openings $f$ of the wooden boxes E F, resting on flanges $c\ d$, and against flanges $c'\ d'$, so as to form one continuous opening through the spokes and hub for the axle. The boxes C D are held together against the spokes by means of bolts G passing through box C, suitable recesses being formed in wooden box E for their heads, holes $g$ in the spokes, box D, wooden box F, and metal washer H, on the outside of which they are secured by nuts $h$. Caps I J rest against boxes C D E F, and finish the hub, being secured to them by screws.

Bolts $i$, shown in red lines in Fig. 1, may secure the outer rims or flanges $c\ d$ to the spokes, passing through holes $j$ formed in the spokes. (See red lines, Fig. 2.)

The great advantage of my improvement in carriage or wagon wheels is, that its construction prevents the spokes from working out and in by the wear of the wheels.

In wheels in which the spokes are separately driven into proper spaces in the hub-box, their wear will loosen the spokes in their box, and render them more liable to be broken, while in my wheel, the spokes being thoroughly united at their base, and held by the rims $b'$, they support each other, and prevent each other from moving in or out.

Should any spoke break, and it is desirable to replace it by a new one, the base of the broken spoke can easily be sawed out, and a new spoke glued and forced into its place.

Having thus described my invention, what I claim as new, and desire to secure by Letters Patent, is—

A wheel-hub consisting of two sets of boxes, C D E F, not contiguous to each other, and secured substantially as and for the purposes set forth.

SIMEON ATHA.

Witnesses:
R. N. JORDAN,
CHARLES KENDALL.